Figure 1:
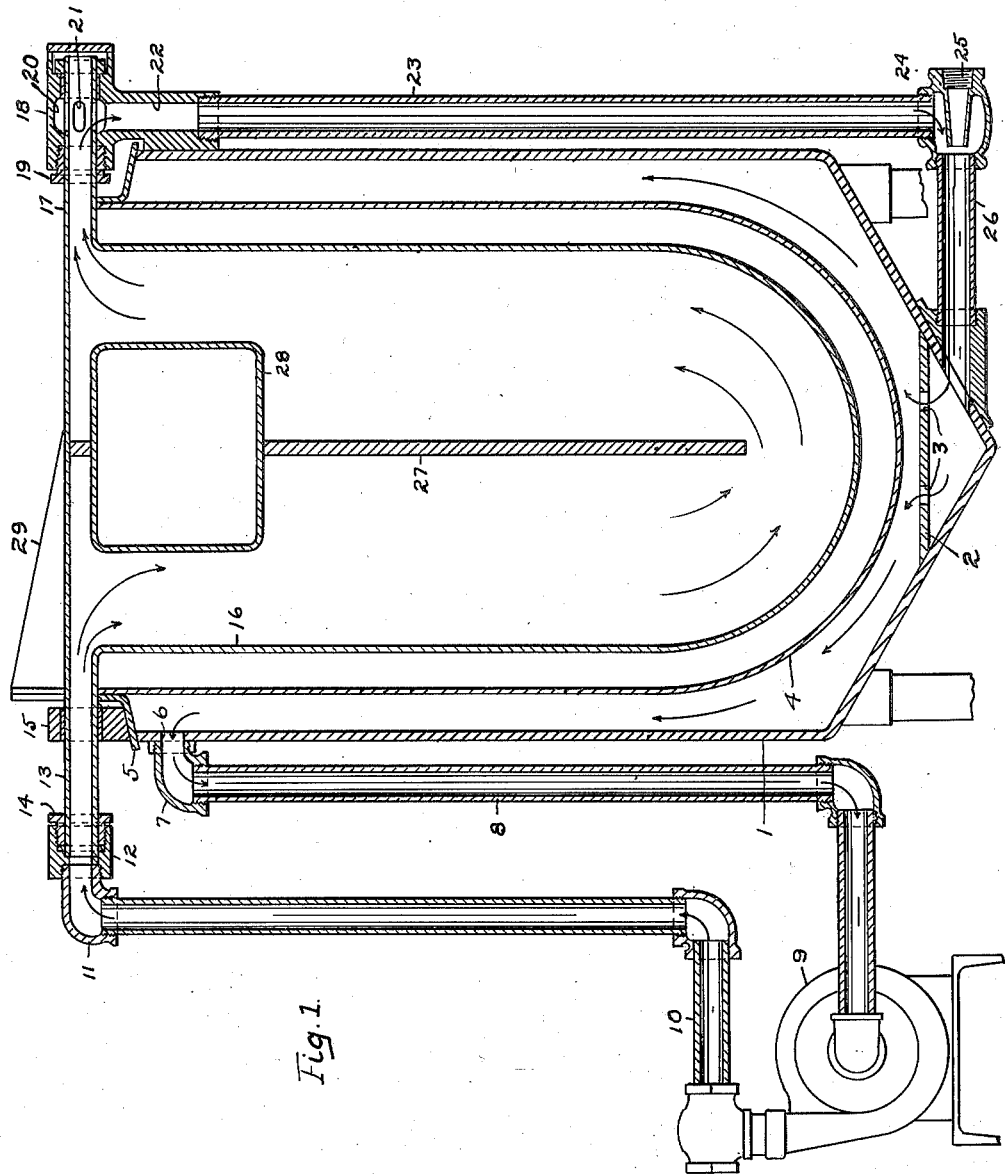

Aug. 3, 1937.     W. A. BARRETT     2,088,990
PASTEURIZER
Filed Nov. 5, 1935     2 Sheets-Sheet 1

INVENTOR.
Walter A. Barrett
BY
ATTORNEYS.

Aug. 3, 1937.  W. A. BARRETT  2,088,990
PASTEURIZER
Filed Nov. 5, 1935  2 Sheets-Sheet 2
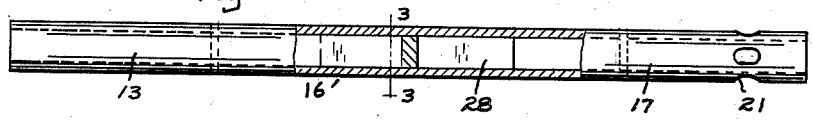
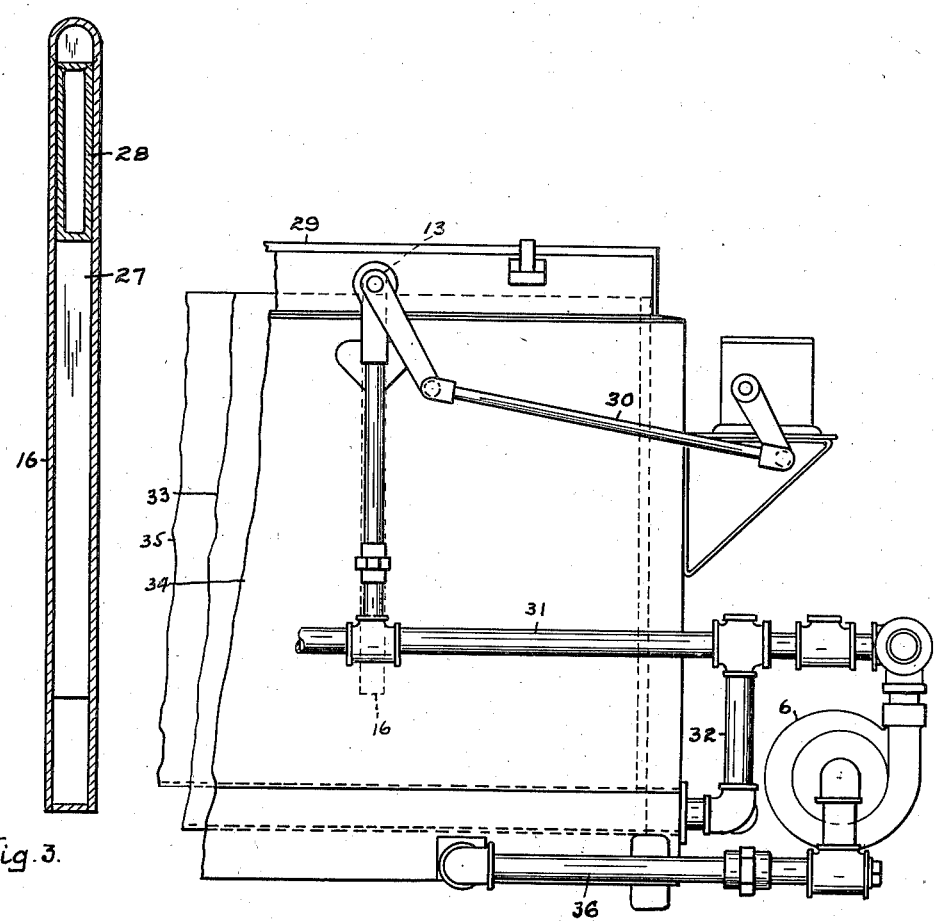
INVENTOR.
Walter A. Barrett
BY
Elwin M. Hulse
ATTORNEY Patented Aug. 3, 1937

2,088,990

UNITED STATES PATENT OFFICE 2,088,990

PASTEURIZER

Walter A. Barrett, Fort Wayne, Ind.

Application November 5, 1935, Serial No. 48,334

2 Claims. (Cl. 257—78)

The invention relates to dairy machinery and it is particularly directed to machines for pasteurizing milk and cream in which the product is subjected to a heating medium to raise the temperature thereof to a predetermined degree.

In the machines generally in use the product is contained in a receptacle and heat is applied to the outer surface of the receptacle, the product being generally simultaneously agitated. The uniform heating of the entire product to the maximum temperature is necessarily relatively slow since the heat is applied externally and it is transmitted by convection to the product.

The object of my invention is to increase the speed of raising the temperature of dairy products and to uniformly heat the products by applying heat externally to the product containing receptacle and internally to the contents thereof.

Another object is to supply the heating medium to the agitator and externally to the receptacle, either by passing the medium first through the agitator and then about the receptacle or by dividing the supply, one part being passed through the agitator and the other part being passed about the receptacle.

An embodiment of the invention is illustrated in the drawings in which

Figure 1 is a vertical cross-section of a machine embodying the invention. Figure 2 is a plan view of the agitator partly in section. Figure 3 is a cross-section on line 3—3 of Figure 2 and Figure 4 is an elevation, broken away, of a modified form of the machine having the invention applied thereto.

Referring to the illustrative embodiment of the invention 1 represents a tank of selected shape, preferably rectangular and having a V-shaped bottom and having a horizontal partition 2 at a suitable point above the lowest point of said bottom. A suitable number of openings 3 is formed in the partition to afford communications between the opposite sides of the same.

A receptacle 4 is suspended in the tank 1 and in spaced relation thereto. An angle plate 5 is attached or engaged on the upper edge of the tank and closely abuts in fluid tight manner the outer surface of the receptacle above the tank thereby closing the space between the walls of the tank and the receptacle.

An opening 6 is formed in the wall of the tank preferably adjacent to the angle plate and an elbow 7 is connected to the tank at said opening. A conduit 8 leads from the elbow 7 to the suction side of a pump 9 and a conduit 10 leads from the discharge side of the pump to an elbow 11 that is engaged in a union 12. A hollow shaft 13 is revolubly mounted in the union and rendered fluid tight by the gland and nut 14. A bearing 15 is mounted on the angle plate 5 and supports the shaft 13.

The shaft 13, at its inner end, is part of the agitator 16 and communicates with the interior thereof, the agitator being suspended within the receptacle 4 by the said shaft and by the hollow shaft 17 at the opposite side thereof. The shaft 17 also communicates with the agitator and is revolubly mounted in the fitting 18 that is suitably mounted on the tank 1. The gland and nut 19 make the shaft 17 fluid tight in the fitting.

An annular cavity 20 is formed in the fitting 18 and a suitable number of openings 21 is formed in the shaft 17 which form communications between the shaft and the annular cavity 20. The passage-way 22 in the fitting leads from the cavity 20 to a conduit 23 that connects at its lower end to a fitting 24 to which a steam line may be connected at 25. A conduit 26 is connected to the fitting 24 and the bottom of the bank below the partition 2.

A baffle 27 is mounted within the agitator 16, its upper portion 28 being expanded and hollow.

As many agitators may be used as the machine will require and steam may be admitted at any desired point or points of the machine.

On one side of the machine the upright arm of the angle plate 5 and the adjacent portions of the wall of the receptacle 4 are extended above the shaft 13 and form a wall, to which to attach a lid or lids 29 for closing the open top of the receptacle.

In operation water is supplied to the tank and steam is turned on to heat it to the desired temperature. The product to be treated is deposited in the receptacle 4 and the pump is set into operation. Suitable means 30 (Fig. 4) is connected to the agitator to cause it to oscillate. The pump forces the water upwardly in the space about the receptacle 4 from which it passes through the conduit 8 to the pump. The heating medium passes from the pump through the conduit 10 and the shaft 13 into the hollow agitator 16 in which it flows downwardly on one side of the baffle 27 and upwardly on the other side and discharges through the hollow shaft 17, the fitting 18 and the conduits 23, 26 back to the tank.

The medium heats the oscillating agitator so that it heats the central portion of the product and the upwardly flowing medium between the tank and the receptacle heats the wall of the receptacle and the contents of the receptacle, thus expediting the pasteurizing process.

In Fig. 4 I illustrate the application of the invention to the type of pasteurizer described in my prior Patent No. 1,878,304 in which there is an intermediate tank 33 between the outer tank 34 and the inner receptacle 35 and in which the heating medium is delivered into the intermediate tank through which it travels upwardly and overflows into the outer tank, and is withdrawn from the outer tank and returned to the intermediate tank. To accomplish the foregoing circulation I divide the supply discharged by the pump 6, one part flowing through the conduit 31 to the shaft 13 and the other part flowing through the conduit 32 into the intermediate tank 33 and below the inner receptacle. The medium flows through the agitator 16 in the receptacle 35 as before described and discharges into the outer tank 34, and the pump withdraws the medium from the outer tank through the conduit 36.

What I claim is:

1. A machine of the class described comprising a tank, a receptacle supported within the tank and in spaced relation thereto, a hollow agitator mounted in the receptacle for oscillation and having a vertically disposed baffle therein, a pump having connection with the interior of the agitator on one side of the baffle, the agitator on the opposite side of the baffle having a connection with the tank below the receptacle and a connection between the pump and the tank whereby to cause a circulation of heat exchange medium through the agitator and about the receptacle.

2. A machine of the class described comprising a tank, a receptacle supported within the tank and in spaced relation thereto, an oscillating hollow agitator in the receptacle having fluid intake and discharge members respectively communicating therewith and movable therewith, means connecting the discharge member to the lower portion of the tank and a pump having connections with the upper portion of the tank and with the fluid intake member and adapted to deliver a heating medium to the fluid intake member and to withdraw the medium from the upper portion of the tank whereby the heating medium is caused to circulate through the agitator and between the tank and the receptacle.

WALTER A. BARRETT.